US007804476B2

(12) United States Patent
Hector et al.

(10) Patent No.: US 7,804,476 B2
(45) Date of Patent: Sep. 28, 2010

(54) ACTIVE MATRIX DISPLAY DEVICE

(75) Inventors: Jason R. Hector, Redhill (GB); Martinus P. Creusen, Wijlre (NL)

(73) Assignee: TPO Hong Kong Holding Limited, Shatin, Hong Kong SAR (CN)

( * ) Notice: Subject to any disclaimer, the term of this patent is extended or adjusted under 35 U.S.C. 154(b) by 1093 days.

(21) Appl. No.: 10/597,410

(22) PCT Filed: Jan. 27, 2005

(86) PCT No.: PCT/IB2005/050346

§ 371 (c)(1),
(2), (4) Date: Jul. 25, 2006

(87) PCT Pub. No.: WO2005/073951

PCT Pub. Date: Aug. 11, 2005

(65) Prior Publication Data

US 2008/0231620 A1 Sep. 25, 2008

(30) Foreign Application Priority Data

Jan. 29, 2004 (GB) ................................ 0402046.7

(51) Int. Cl.
*G09G 3/36* (2006.01)
*G09G 5/00* (2006.01)
*G06F 3/038* (2006.01)

(52) U.S. Cl. ....................... 345/101; 345/204; 345/208; 345/100; 345/89

(58) Field of Classification Search ........... 345/50–101, 345/208–214
See application file for complete search history.

(56) References Cited

U.S. PATENT DOCUMENTS

| | | | | |
|---|---|---|---|---|
| 7,071,929 B2 * | 7/2006 | Fujii | .......................... | 345/204 |
| 2001/0017611 A1 * | 8/2001 | Moriyama | .................. | 345/100 |
| 2004/0169627 A1 * | 9/2004 | Hong | .......................... | 345/89 |

FOREIGN PATENT DOCUMENTS

| | | |
|---|---|---|
| EP | 0286309 | 10/1988 |
| EP | 0584358 | 3/1994 |
| EP | 0678843 | 10/1995 |
| EP | 0707301 | 4/1996 |
| WO | 87/05429 | 9/1987 |
| WO | 94/25954 | 11/1994 |
| WO | 00/41465 | 7/2000 |
| WO | 03/049076 | 6/2003 |

* cited by examiner

*Primary Examiner*—Sumati Lefkowitz
*Assistant Examiner*—Charles Hicks
(74) *Attorney, Agent, or Firm*—Liu & Liu

(57) ABSTRACT

A display device comprising an array of pixels, with gates of thin film transistors of the pixels in a row connected to a row conductor. Row driver circuitry provides row address signals for controlling the switching of the transistors of the pixels of the row including an ON gate voltage and an OFF gate voltage. Control circuitry shifts the ON gate voltage and the OFF gate voltage in dependence on drive and/or environmental conditions such as temperature and/or refresh rate. The control circuitry maintains a constant difference between the ON gate voltage and the OFF gate voltage. This allows the gap between the on and off voltages to be reduced, which results in power savings. The kickback voltage is kept constant so that kickback compensation is kept simple.

19 Claims, 3 Drawing Sheets

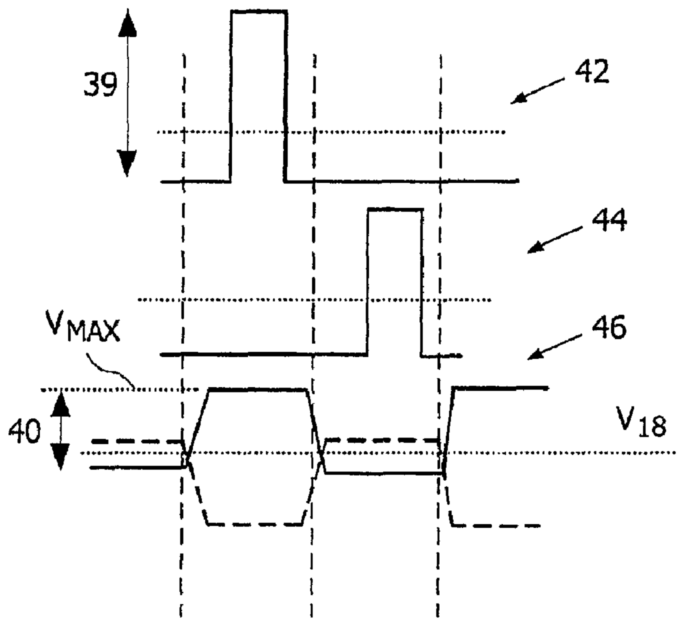
FIG. 3 (PRIOR ART)
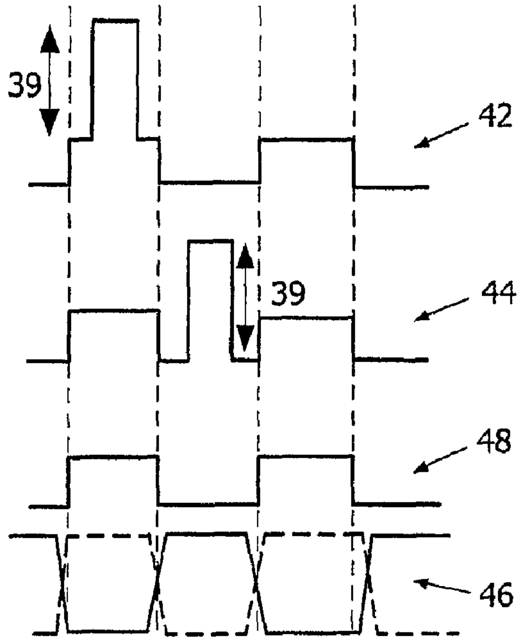
FIG. 4 (PRIOR ART)

ACTIVE MATRIX DISPLAY DEVICE

This invention relates to active matrix display devices, in particular having a pixel configuration using a thin film transistor switching device.

This type of display typically comprises an array of pixels arranged in rows and columns. Each row of pixels shares a row conductor which connects to the gates of the thin film transistors of the pixels in the row. Each column of pixels shares a column conductor, to which pixel drive signals are provided. The signal on the row conductor determines whether the transistor is turned on or off.

In the case of a liquid crystal display, when the transistor is turned on, by a high voltage pulse on the row conductor, a signal from the column conductor is allowed to pass on to an area of liquid crystal material, thereby altering the light transmission characteristics of the material. An additional storage capacitor may be provided as part of the pixel configuration to enable a voltage to be maintained on the liquid crystal material even after removal of the row electrode pulse.

The frame (field) period for active matrix display devices requires a row of pixels to be addressed in a short period of time, and this in turn imposes a requirement on the current driving capabilities of the transistor in order to charge or discharge the liquid crystal material to the desired voltage level. In order to meet these current requirements, the gate voltage supplied to the thin film transistor needs to fluctuate between values separated by approximately 20-30 volts. For example, the transistor may be turned off by applying a gate voltage of around −8 volts, or even lower, (with respect to the source) whereas a voltage of around 15 volts, or even higher, may be required to bias the transistor sufficiently to provide the required source-drain current to charge or discharge the liquid crystal material sufficiently rapidly.

The gate voltage for the drive transistor when turned off also needs to be sufficiently low to ensure that charge does not leak away during the frame time.

The requirement for large voltage swings in the row conductors requires the row driver circuitry to be implemented using high voltage components. This results in larger IC devices and a more expensive integrated circuit. This also results in high power consumption, increased risk for metal track corrosion at higher voltages and increased (stress induced) degradation rate of the TFTs.

The required gate voltages depend on a number of factors including the materials used for the TFTs, the layout and external parameters such as light and temperature. It has been recognised that temperature has an effect on the threshold voltage of TFTs. In particular, the threshold voltage increases at lower temperatures and this requires an increased gate turn-on voltage. The leakage current increases at higher temperatures, and this requires the TFT to be turned harder off at higher temperatures (which requires a lower gate turn-off voltage).

Conventionally, these parameters are factored in to the turn-on and turn-off gate voltages so that satisfactory turn-on and turn-off performance is provided for all operating temperatures.

It has, however, also been proposed in US 2001/0040543 to make the gate turn-on voltage controlled in dependence on temperature, so that consistent pixel charging characteristics are obtained at different temperatures.

A further difficulty which arises in the design and control of liquid crystal displays results from so-called kickback. A kickback voltage results from the parasitic gate-source capacitance ($C_{GS}$) in the drive transistor. When the gate voltage changes from the on to the off level, charge is transferred from the pixel storage capacitor ($C_S$) and the LC cell capacitance ($C_{LC}$) to the parasitic capacitance. This results in a change in voltage which alters the grey scale output of the pixel. This change in voltage is called the kickback voltage:

$$V_K = C_{GS}/(C_{GS}+C_{LC}+C_S)*(V_{ON}-V_{OFF})$$

Where $V_{ON}$ and $V_{OFF}$ are the on and off gate voltages. It is known to correct for the kickback effect, which gives rise to flicker, by using a DC compensation voltage to counter the kickback effect. This DC voltage is applied to the common electrode. There are various other more complicated methods of compensating for kickback which will be well known to those skilled in the art.

A problem with known schemes which manipulate the drive transistor gate voltages, for example in dependence on temperature, is that compensation schemes for kickback do not then operate correctly, or else more complicated compensation schemes are required. In particular, the kickback voltage itself is dependent on the control voltage levels applied to the drive transistor.

According to the invention, there is provided a display device comprising an array of pixels, each pixel comprising a thin film transistor switching device and a display element, the array being arranged in rows and columns, wherein each row of pixels shares a row conductor, which connects to the gates of the thin film transistors of the pixels in the row, wherein row driver circuitry provides row address signals for controlling the switching of the transistors of the pixels of the row, wherein the row address signals each comprise a waveform for providing an ON gate voltage and an OFF gate voltage to the drive transistor, wherein the device further comprises control circuitry for shifting the ON gate voltage and the OFF gate voltage in dependence on drive and/or environmental conditions, the control circuitry maintaining a constant difference between the ON gate voltage and the OFF gate voltage.

In this device, the gate control levels are shifted in response to drive and/or environmental conditions, and this allows the gap between the on and off voltages to be reduced, which results in power savings. In addition, the gap between the on and off gate control levels is maintained constant, so that the kickback voltage is constant, and therefore can be compensated in conventional manner.

A temperature sensor may be provided, and the control circuitry then shifts the ON gate voltage and the OFF gate voltage in dependence on temperature. In particular, the ON gate voltage and the OFF gate voltage are both higher for lower temperatures than for higher temperatures.

Alternatively or additionally, the control circuitry can shift the ON gate voltage and the OFF gate voltage in dependence on the display device refresh rate. In particular, the ON gate voltage and the OFF gate voltage are both higher for higher refresh rates than for lower refresh rates.

These compensation schemes allow power savings to be maximised.

Preferably, each column of pixels shares a column conductor to which pixel drive signals are provided, and wherein column address circuitry provides the pixel drive signals.

The display device of the invention can be used in a portable battery operated device, and the power savings provided then have particular benefit.

The invention also provides a row driver circuit for an active matrix display device for providing row address signals, in which device each pixel comprises a thin film transistor switching device and a display element, and the row address signals are provided to the gates of the thin film transistors of the pixels in the row, wherein row driver circuit comprises:

means for providing row address signals comprising a waveform for providing an ON gate voltage and an OFF gate voltage to the drive transistor, an input for receiving a control signal dependent on drive and/or environmental conditions; and means for shifting the ON gate voltage and the OFF gate voltage in response to the control signal, and maintaining a constant difference between the ON gate voltage and the OFF gate voltage.

The invention also provides a method of generating row address signals for an active matrix display device, the method comprising:

providing row address signals comprising a waveform for providing an ON gate voltage and an OFF gate voltage to the drive transistors of the pixels in a row, and shifting the ON gate voltage and the OFF gate voltage in dependence on drive and/or environmental conditions whilst maintaining a constant difference between the ON gate voltage and the OFF gate voltage.

The shifting may again be in dependence on temperature and/or the display device refresh rate.

Examples of the invention will now be described in detail with reference to the accompanying drawings, in which:

FIGS. 3 and 4 show different (known) row waveforms which may be used in the driving of an active matrix display;

Figure 1:
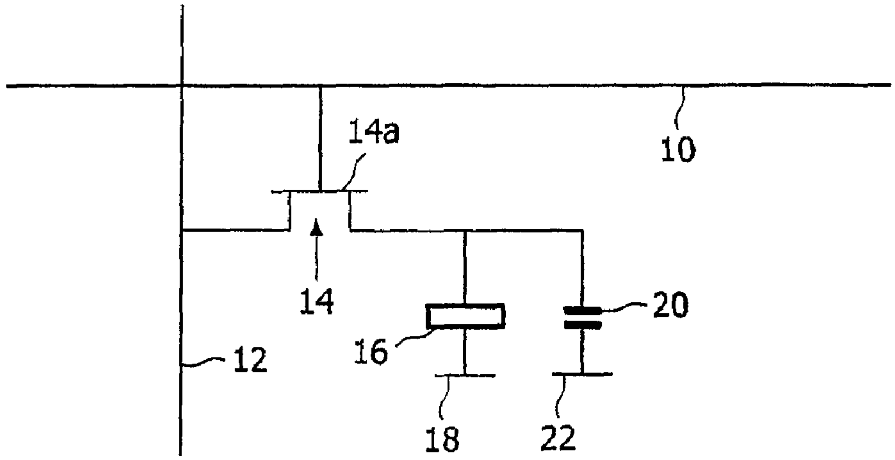
FIG. 1 (PRIOR ART)
FIG. 1 shows one example of a known pixel configuration for an active matrix liquid crystal display.

FIG. 1 shows a conventional pixel configuration for an active matrix liquid crystal display. The display is arranged as an array of pixels in rows and columns. Each row of pixels shares a common row conductor 10, and each column of pixels shares a common column conductor 12. Each pixel comprises a thin film transistor 14 and a liquid crystal cell 16 arranged in series between the column conductor 12 and a common potential 18. The transistor 14 is switched on and off by a signal provided on the row conductor 10. The row conductor 10 is thus connected to the gate 14*a* of each transistor 14 of the associated row of pixels. Each pixel may additionally comprise a storage capacitor 20 which is connected at one end 22 to the next row electrode, to the preceding row electrode, or to a separate capacitor electrode. This capacitor 20 stores a drive voltage so that a signal is maintained across the liquid crystal cell 16 even after the transistor 14 has been turned off.

In order to drive the liquid crystal cell 16 to a desired voltage to obtain a required gray level, an appropriate signal is provided on the column conductor 12 in synchronism with a row address pulse on the row conductor 10. This row address pulse turns on the thin film transistor 14, thereby allowing the column conductor 12 to charge the liquid crystal cell 16 to the desired voltage, and also to charge the storage capacitor 20 to the same voltage. At the end of the row address pulse, the transistor 14 is turned off, and if a storage capacitor 20 is used then this maintains a voltage across the cell 16 when other rows are being addressed. The storage capacitor 20 reduces the effect of liquid crystal leakage and reduces the percentage variation in the pixel capacitance caused by the voltage dependency of the liquid crystal cell capacitance. The rows are addressed sequentially so that all rows are addressed in one frame period, and refreshed in subsequent field periods.

Figure 2:
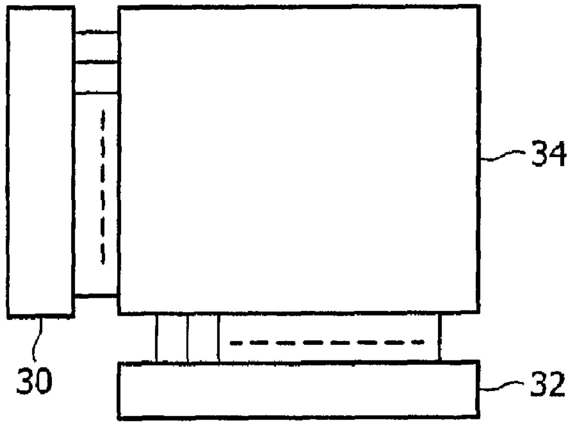
FIG. 2 (PRIOR ART)
FIG. 2 shows a display device including row and column driver circuitry.

As shown in FIG. 2, the row address signals are provided by row driver circuitry 30, and the pixel drive signals are provided by column address circuitry 32, to the array 34 of display pixels.

In order to enable a sufficient current to be driven through the thin film transistor 14, which is typically implemented as an amorphous silicon thin film device, a high gate voltage must be used. In particular, the period during which the transistor is turned on is approximately equal to the total frame period within which the display must be refreshed, divided by the number of rows. The gate voltage for the on-state and the off-state may differ by 20-30 volts in order to provide the required small leakage current in the off-state, and sufficient current flow in the on-state to charge or discharge the liquid crystal cell 16 within the available time. As a result, the row driver circuitry 30 uses high voltage components.

FIG. 3 shows a first example of a known addressing scheme for driving the display of FIG. 1. A signal applied to each row comprises a rectangular pulse having a height 39 of approximately 30 volts. The required oscillation of the column signal, in order to oscillate from a transmissive to a non-transmissive state of the liquid crystal material typically has a voltage fluctuation 40 of around 10 volts. The row waveforms in FIG. 3 represent the row driver pulse 42 for one row, the row driver pulse 44 for a subsequent row, and the signal to be applied to the column conductor as waveforms 46. The voltage $V_{18}$ is the common electrode voltage. It is known to alternately charge the liquid crystal material to positive and negative voltages, so that the average voltage across the LC cell during operation is zero. This prevents degradation of the material and is known as inversion, and is represented in FIG. 3 by the dashed column waveforms.

The pulse height 39 must be sufficiently large that when the column carries the highest pixel drive signal, the peak gate voltage gives rise to a sufficient gate-source voltage above threshold to turn on the drive transistor. Similarly, the lowest gate drive voltage must be below the threshold voltage for the lowest pixel drive signal. In the circuit of FIG. 1, the drive transistor is an n-type device, and the drain is connected to the column 12 and the source is connected to the LC cell 16. Assuming the drain and source voltages are approximately equal, the gate turn-on voltage on the row needs to exceed the maximum pixel drive voltage on the column ($V_{MAX}$ in FIG. 3) by the desired over-threshold voltage, The voltage swing on the column electrode signal required by the drive scheme of FIG. 3 also requires the column address circuitry 32 to be implemented using high voltage components. However, alternative drive schemes exist with the aim of reducing the voltage swing on the column electrode 12, thereby enabling the column address circuitry 32 to be implemented using low voltage components. FIG. 4 shows a first example of an alternative known drive scheme, known as “common electrode drive”. In this case, the voltage on the common electrode 18 is no longer constant, and is caused to fluctuate. This is shown at plot 48. This enables the voltage swing on the column electrode 12 to be reduced, as shown with plot 46. However, this drive scheme requires a more complicated row waveform, and in the example illustrated in FIG. 4, each row pulse has three discrete voltages defining the row signal waveform. There are other ways of implementing reduced voltages on the column conductors. For example a separate capacitor electrode can also be provided. FIG. 4 shows one preferred drive scheme.

In FIG. 4, the row pulse with voltage height 39 is now superimposed on a carrier which follows the common electrode voltage waveform 48. The pulse height 39 still defines the turn on and turn off characteristics of the drive transistor, rather than the total row waveform height.

These drive schemes will be well known to those skilled in the art.

In this description and claims the term "ON gate voltage" and "OFF gate voltage" are used to refer to the effective gate voltages applied to the drive transistor to turn the drive transistor on and off. The effective gate voltage is the voltage relative to the voltages applied to the column, which determine the source and drain voltages of the drive transistor. In the case of the drive scheme of FIG. 4, the effective gate voltage comprises pulses of height 39, with removal of the superimposed common electrode waveform, as this common electrode waveform is also superimposed into the column voltage waveforms 46.

The invention uses control circuitry to shift the (effective) ON gate voltage and the OFF gate voltage in dependence on drive and/or environmental conditions. The control circuitry maintains a constant difference between the ON gate voltage and the OFF gate voltage, and thereby effectively shifts the complete row waveform up and down in dependence on conditions. Because the gap between the on and off gate voltages is maintained constant, the kickback voltage is constant and can be compensated in conventional manner.

Figure 5:
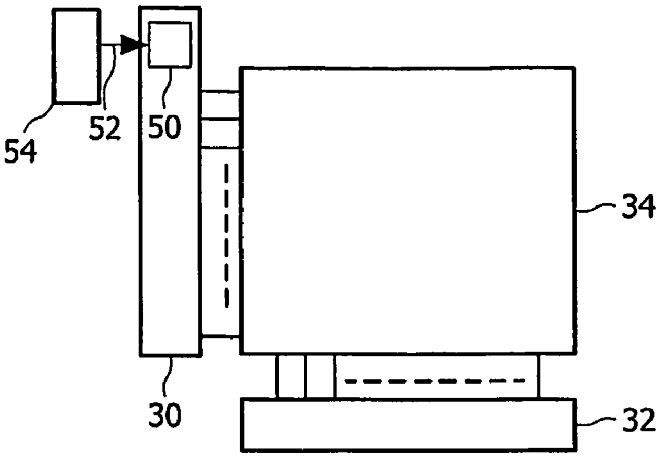
FIG. 5 shows an example of circuitry for generating row signals in accordance with the invention.

FIG. 5 shows schematically circuitry for implementing the invention. The row driver circuit 30 is provided with a level shifting circuit 50. This may shift the power rails supplied to the other circuitry of the row driver circuitry to result in the desired shifting of the row waveforms. The row waveform generation circuitry in the row driver can thus be conventional. The shifting circuitry is controlled by one or more inputs 52 from sensing or control circuitry 54.

In one example, the sensing/control circuitry 54 comprises a temperature sensor. The control circuitry then shifts the ON gate voltage and the OFF gate voltage in dependence on temperature, in particular to higher values for lower temperatures than for higher temperatures.

The sensing/control circuitry may instead or additionally provide the display refresh rate to the circuitry 50. A display may have different refresh rates for different modes of operation. For example, a lower refresh rate may be used in a standby mode of operation or in other modes of operation when only slowly changing images are to be displayed. This may be a power saving technique, and this invention provides further power saving opportunities. The refresh rate may itself be controlled in dependence on temperature, for example a slower refresh rate may be acceptable at lower temperatures, when the LC response is slower and when leakage currents are lower.

The ON gate voltage and the OFF gate voltage will be higher for higher refresh rates than for lower refresh rates.

The adaptive control of the gate voltages using the invention enables the voltage height of the row address pulses to be reduced, whilst still allowing the pixel circuits to function satisfactorily for the prevailing environmental conditions and drive conditions.

The implementation of the circuitry shown in FIG. 5 will be routine to those skilled in the art.

Figure 6:
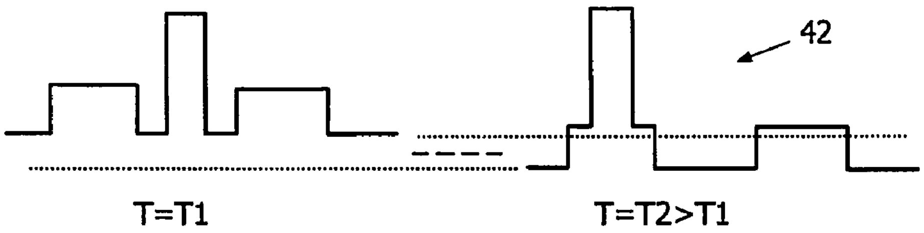
FIG. 6 shows an example row waveform generated by the row driver circuit of the invention.

FIG. 6 shows how the row waveforms may evolve over time as the temperature increases, and for the common electrode drive scheme of FIG. 4. As shown, the complete waveform shifts over time, but maintaining the same pulse heights. The invention can be applied to other addressing schemes, and FIG. 6 is given as one example only.

The invention enables convention kickback compensation to be employed. For example, a DC offset may be applied to the common electrode waveform 48 of FIG. 4, although other compensation schemes can be employed.

Figure 7:
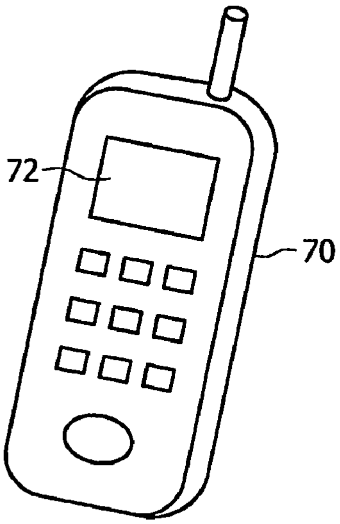
FIG. 7 shows a mobile telephone using the display of the invention.

The power savings enabled by the invention are of particular benefit in portable devices. FIG. 7 shows a mobile telephone 70 having a display device 72 of the invention. The drive method of the invention enables power savings and therefore prolonged battery life.

The invention can be applied to displays using many different technologies. Amorphous silicon drive transistors require particularly large voltage swings, but the invention may also be applied to displays using polycrystalline silicon pixel transistors. Furthermore, the invention can be applied to other display technologies and is not limited to liquid crystal displays.

The terms "row" and "column" are somewhat arbitrary in the description and claims. These terms are intended to clarify that there is an array of elements with orthogonal lines of elements sharing common connections. Although a row is normally considered to run from side to side of a display and a column to run from top to bottom, the use of these terms is not intended to be limiting in this respect.

The row and column circuits may be implemented as integrated circuits, and the invention also relates to the row circuit for implementing the display architecture described above.

Other features of the invention will be apparent to those skilled in the art.

The invention claimed is:

1. A display device comprising an array of pixels, each pixel comprising a thin film transistor switching device (14) and a display element (16), the array being arranged in rows and columns, wherein each row of pixels shares a row conductor (10), which connects to the gates (14*a*) of the thin film transistors (14) of the pixels in the row, wherein row driver circuitry (30) provides row address signals for controlling the switching of the transistors (14) of the pixels of the row, wherein the row address signals each comprise a waveform (42, 44) for providing an ON gate voltage and an OFF gate voltage to the drive transistor (14), wherein the device further comprises control circuitry (50) for shifting the amplitudes of the ON gate voltage and the OFF gate voltage in dependence on drive and/or environmental conditions, the control circuitry (50) maintaining a constant amplitude difference (39) between the ON gate voltage and the OFF gate voltage.

2. A display device as claimed in claim 1, further comprising a temperature sensor (54), and wherein the control circuitry (50) shifts the ON gate voltage and the OFF gate voltage in dependence on temperature.

3. A display device as claimed in claim 2, wherein the ON gate voltage and the OFF gate voltage are both higher for lower temperatures than for higher temperatures.

4. A display device as claimed in claim 1, wherein the control circuitry (50) shifts the ON gate voltage and the OFF gate voltage in dependence on the display device refresh rate.

5. A display device as claimed in claim 4, wherein the ON gate voltage and the OFF gate voltage are both higher for higher refresh rates than for lower refresh rates.

6. A device as claimed in claim 1, wherein each column of pixels shares a column conductor (12) to which pixel drive signals are provided, and wherein column address circuitry (32) provides the pixel drive signals.

7. A display device as claimed in claim 1, comprising a liquid crystal display.

8. A display device as claimed in claim 1 further comprising means for compensating for kickback.

9. A portable device (70) having a display device (72) as claimed in claim 1.

10. A row driver circuit for an active matrix display device for providing row address signals, in which device each pixel comprises a thin film transistor (14) switching device and a display element (16), and the row address signals are provided to the gates (14*a*) of the thin film transistors (14) of the pixels in the row, wherein row driver circuit comprises:

means (30) for providing row address signals comprising a waveform for providing an ON gate voltage and an OFF gate voltage to the drive transistor, an input for receiving a control signal (52) dependent on drive and/or environmental conditions; and means (50) for shifting the amplitude of the ON gate voltage and the OFF gate voltage in response to the control signal (52), and maintaining a constant amplitude difference between the ON gate voltage and the OFF gate voltage.

11. A method of generating row address signals for an active matrix display device, the method comprising:

providing row address signals (42, 44) comprising a waveform for providing an ON gate voltage and an OFF gate voltage to the drive transistors (14) of the pixels in a row, and shifting the amplitude of the ON gate voltage and the OFF gate voltage in dependence on drive and/or environmental conditions whilst maintaining a constant amplitude difference between the ON gate voltage and the OFF gate voltage.

12. A method as claimed in claim 11, wherein the shifting is in dependence on temperature.

13. A method as claimed in claim 11, wherein the shifting is in dependence on the display device refresh rate.

14. A display device as claimed in claim 1, wherein the control circuitry shifts both of the ON gate voltage and the OFF gate voltage.

15. A display device as claimed in claim 14, wherein the control circuitry shifts both of the ON gate voltage and the OFF gate voltage by applying a DC voltage to a common electrode.

16. A row driver circuit as claimed in claim 10, wherein the means for shifting shifts both of the ON gate voltage and the OFF gate voltage.

17. A row driver circuit as claimed in claim 16, wherein the means for shifting shifts both of the ON gate voltage and the OFF gate voltage by applying a DC voltage to a common electrode.

18. A method as claimed in claim 11, wherein the shifting step comprises shifting both of the ON gate voltage and the OFF gate voltage.

19. A method as claimed in claim 18, wherein the shifting step comprises shifting both of the ON gate voltage and the OFF gate voltage by applying a DC voltage to a common electrode.

* * * * *